US007814428B2

(12) United States Patent
Bicker et al.

(10) Patent No.: US 7,814,428 B2
(45) Date of Patent: Oct. 12, 2010

(54) VISUALIZING NAVIGABLE OBJECT HIERARCHY

(75) Inventors: Sandra Bicker, Heidelberg (DE); Iris Nieder, Walldorf (DE); Annett Hardt, Mannheim (DE); Ingo Deck, Mannheim (DE); Erik Oster, Heidelberg (DE); Till Brinkmann, Mannheim (DE); Boris Bierbaum, Frankfort/Main (DE); Martin Dauer, Alsting (FR); Theo Held, Wiesloch (DE); Martin Schrepp, Hockenheim (DE); Kerstin Dittmar, Rheinstetten (DE)

(73) Assignee: SAP AG, Walldorf (DE)

( * ) Notice: Subject to any disclaimer, the term of this patent is extended or adjusted under 35 U.S.C. 154(b) by 499 days.

(21) Appl. No.: 11/670,823

(22) Filed: Feb. 2, 2007

(65) Prior Publication Data
US 2007/0266321 A1 Nov. 15, 2007

Related U.S. Application Data

(60) Provisional application No. 60/800,055, filed on May 12, 2006.

(51) Int. Cl.
G06F 15/00 (2006.01)
G06F 13/00 (2006.01)
(52) U.S. Cl. .......................... 715/763; 715/851
(58) Field of Classification Search ......... 715/763–765, 715/851–853, 740–743, 854
See application file for complete search history.

(56) References Cited

U.S. PATENT DOCUMENTS 7,506,273 B2 * 3/2009 Lahiri ........................ 715/854

2004/0036719 A1 * 2/2004 Van Treeck ................. 345/763

OTHER PUBLICATIONS

SAP AG, CRM 5.0 Screen shot for a business object having address information, 1 page.
SAP AG, CRM 5.0 Screen shot for a business object with additional address information, 1 page.
SugarCRM, Screen shot from "Sugar Suite," 1 page.
'Product Catalog—Sales Force Automation (SFA)' [online]. Salesforce.com, published no later than Dec. 28, 2005, [retrieved on Jan. 11, 2007]. Retrieved from the Internet: <URL: web.archive.org/web/20051219055233/www.salesforce.com/products/feature.jsp?na>, 2 pages.

(Continued)

*Primary Examiner*—Cao "Kevin" Nguyen
(74) *Attorney, Agent, or Firm*—Fish & Richardson P.C.

(57) ABSTRACT

A graphical user interface (GUI) includes a details area containing first detail information for a first object instance. The first object instance is part of a hierarchy that includes several object instances of more than one object. The first detail information is presented using at least one GUI component associated with the first object instance. Included in the details area is a hierarchy GUI component that presents at least a portion of the hierarchy including the first object instance, and providing for user selection of any of the several object instances in the hierarchy. The details area is updated to instead contain second detail information that is for a second object instance selected using the hierarchy GUI component and that is presented using at least one GUI component associated with the second object instance. The details area can include GUI components associated with any of the several object instances.

18 Claims, 8 Drawing Sheets

OTHER PUBLICATIONS

'SugarCRM—CRM Software' [online]. SugarCRM, published no later than Dec. 28, 2005, [retrieved on Jan. 11, 2007]. Retrieved from the Internet: <URL: web.archive.org/web/20051228024337/http://www.sugarcrm.com/crm/>, 2 pages.

Salesforce.com, Screen shot from "Salesforce.com- Professional Edition," 2 pages.

SAP AG, "Implementing People-Centric User Interfaces With Business Server Pages and SAP Enterprise Portal," Nov. 2003, 25 pages.

* cited by examiner

| Installed Base: 123, Changed description after correction | Back ☒ |
|---|---|
| Edit   New | 🅿 Print |

| Installed Base Hierarchy | General Data |
| | Name and Address |
| | Parties Involved |

FIG. 8A

Product Catalog: 119081

Product Catalog

Product Catalog Hierarchy

General Data

FIG. 8B

VISUALIZING NAVIGABLE OBJECT HIERARCHY

CROSS-REFERENCE TO RELATED APPLICATIONS

This application claims priority from U.S. Provisional Application No. 60/800,055, filed May 12, 2006, and entitled "UI Concept," the entire contents of which are incorporated herein by reference.

TECHNICAL FIELD

This document relates to a user interface.

BACKGROUND

Large software systems, for example enterprise resource planning (ERP) or customer relationship management (CRM) systems, can be designed to work with instances of a great number of different objects. In a CRM system from SAP AG, for example, there are the object types accounts, contact persons, campaigns, target groups, orders, opportunities, to name a few examples. A user working with instances of these objects may need access to some or all information in the object from time to time.

These and other objects can, however, contain a great deal of different information, and can therefore be very complex. Moreover, the object's location in a hierarchy can be significant to the user in that it can provide a context for the specific information in the object and a guideline to other information that can be available. Also, users need to create new objects from time to time and this will affect the composition of the hierarchy where the new object is created.

SUMMARY

The invention relates to visualizing a navigable object hierarchy.

In a first general aspect, a computer-implemented method for visualizing a navigable object hierarchy includes displaying a graphical user interface (GUI) that includes a details area containing first detail information for a first object instance. The first object instance is part of a hierarchy that includes several objects instances of more than one object type. The first detail information is presented using at least one GUI component associated with the first object instance. The method further includes including in the details area a hierarchy GUI component presenting at least a portion of the hierarchy that includes the first object instance. The hierarchy GUI component provides for user selection of any of the several objects instances in the hierarchy. The method further includes updating the details area to instead contain second detail information for a second object instance selected using the hierarchy GUI component. The second detail information is presented using at least one GUI component associated with the second object instance. The details area can include GUI components associated with any of the several objects instances.

Implementations can include all, some or none of the following features. The details area may not be configured for user editing of the first detail information or the second detail information, and the method can further include presenting in the GUI, in response to a user input, an editable details area instead of the details area, wherein the hierarchy GUI component is included in the editable details area and provides for user selection of any of the several objects instances in the hierarchy to update the editable details area. The portion of the hierarchy presented in the hierarchy GUI component can include several object instance names, and the method can further include storing a change to at least one of the object instance names upon a user making the change using the hierarchy GUI component. The method can further include performing an operation on at least two objects instances that are part of the hierarchy, wherein a user selected the at least two objects instances in the hierarchy GUI component in a multi-edit operation mode. The hierarchy GUI component can be configured to assume any each operation mode selected from the group consisting of: a non-edit operation mode, a single-edit operation mode, and the multi-edit operation mode. The GUI can be presented to a user and the hierarchy GUI component can be configured according to a personalization setting for the user. The personalization setting can specify at least one characteristic selected from the group consisting of: a location in the details area where the hierarchy GUI component is to be included, a size of the hierarchy GUI component, and a number of columns to be used in the hierarchy GUI component. The method can further include generating a new object instance in the hierarchy in response to receiving a user input. The user input can be made using the hierarchy GUI component, and the method can further include identifying: (i) a level of the hierarchy where to create the new object instance, and (ii) an object type to use for the new object instance, the identification being made based on the second object instance being selected in the hierarchy GUI component when the user input is made. The new object instance can be created as a copy of a user-selected object instance in the hierarchy.

In a second general aspect, a computer program product is tangibly embodied in an information carrier and includes instructions that, when executed, generate on a display device a graphical user interface (GUI) for visualizing a navigable object hierarchy. The graphical user interface includes a details area containing first detail information for a first object instance. The first object instance is part of a hierarchy that includes several objects instances of more than one object type. The first detail information is presented using at least one GUI component associated with the first object instance. The GUI further includes a hierarchy GUI component included in the details area. The hierarchy GUI component presents at least a portion of the hierarchy that includes the first object instance. The hierarchy GUI component provides for user selection of any of the several objects instances in the hierarchy. The details area is configured to be updated to instead contain second detail information for a second object instance selected using the hierarchy GUI component. The second detail information is presented using at least one GUI component associated with the second object instance. The details area can include GUI components associated with any of the several objects instances.

Implementations can include all, some or none of the following features. The details area may not be configured for user editing of the first detail information or the second detail information, and the GUI can further include an editable details area that is presented instead of the details area in response to a user input, wherein the hierarchy GUI component is included in the editable details area and provides for user selection of any of the several objects instances in the hierarchy to update the editable details area. The GUI can be configured for a user to select at least two objects instances in the hierarchy GUI component in a multi-edit operation mode to perform an operation on the at least two objects instances. The hierarchy GUI component can be configured to assume any each operation mode selected from the group consisting of: a non-edit operation mode, a single-edit operation mode, and the multi-edit operation mode. The GUI can be presented to a user and the hierarchy GUI component can be configured according to a personalization setting for the user. The personalization setting can specify at least one characteristic selected from the group consisting of: a location in the details area where the hierarchy GUI component is to be included, a size of the hierarchy GUI component, and a number of columns to be used in the hierarchy GUI component. The GUI can be configured for a user to make an input to generate a new object instance in the hierarchy. The input can be made using the hierarchy GUI component and (i) a level of the hierarchy where to create the new object instance, and (ii) an object type to use for the new object instance, can be identified based on the second object instance being selected in the hierarchy GUI component when the user input is made. The new object instance can be created as a copy of a user-selected object instance in the hierarchy.

Implementations can provide some or all or none of the following advantages. An improved GUI can be provided. An improved visualization of an object hierarchy can be provided. A visualized object hierarchy can be provided that facilitates creation of a new object and/or hierarchy. A navigable object hierarchy can be embedded in a details page of an object. An improved object hierarchy can be provided that can relatively easily be created. An improved object hierarchy can be provided in which object instances within the hierarchy can be relatively easily edited.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 2 shows an example of a hierarchy GUI component included in the FIG. 1 screen.

FIG. 3 shows an example of another object navigated to from the FIG. 2 screen.

FIG. 4 shows an example of a new object created in the hierarchy.

FIGS. 8A-B illustrate examples of positions for a hierarchy.

Like reference symbols in the various drawings indicate like elements.

DETAILED DESCRIPTION

Figure 1:
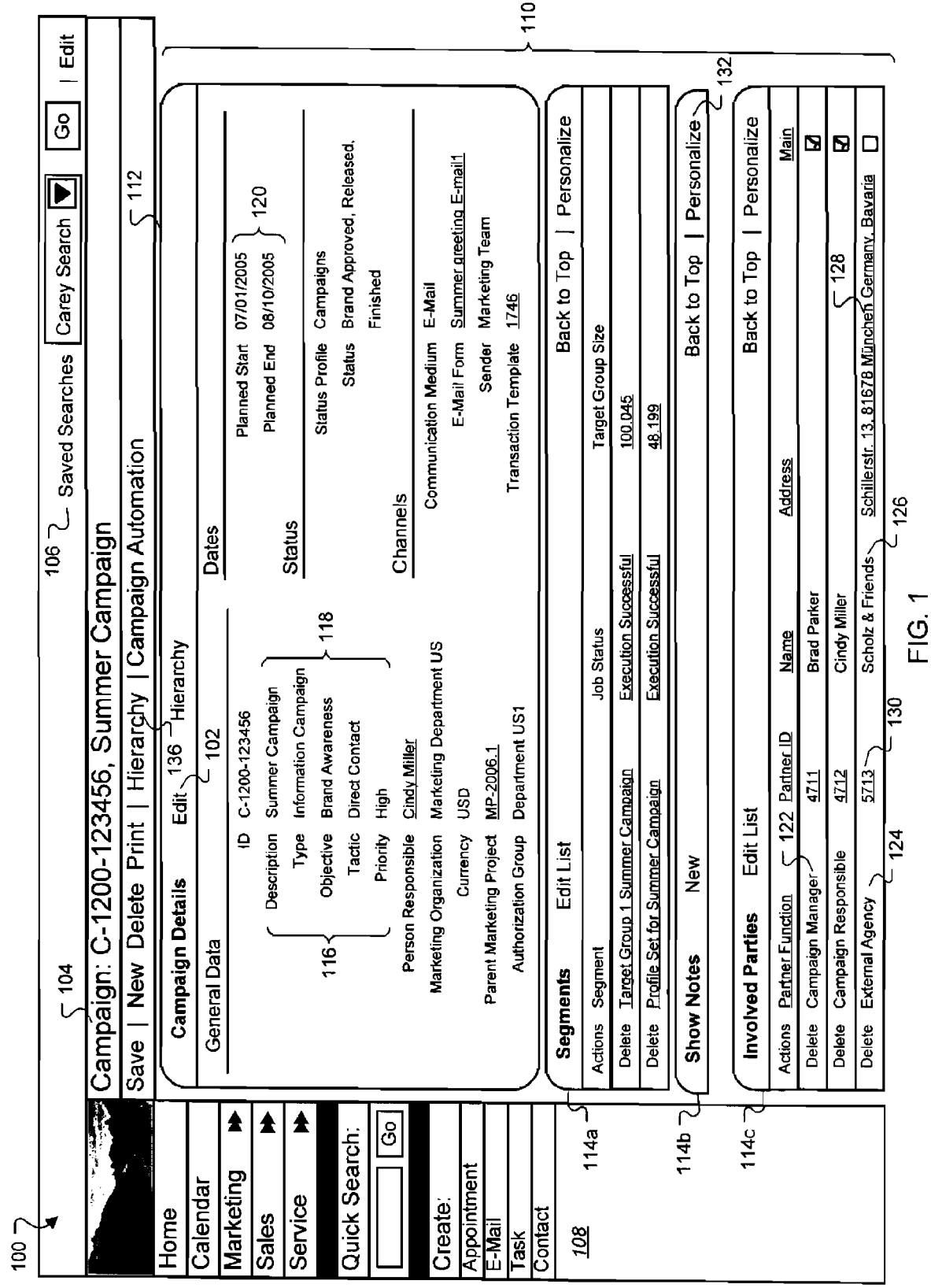
FIG. 1 shows an example of a details screen for an object.

FIG. 1 shows an overview page 100 for a business object in a graphical user interface (GUI). In this and subsequent examples, the business objects referred to are object instances generated from one or more objects. The system(s) described herein can therefore include several object instances of more than one object. For brevity, however, such object instances will hereafter be referred to as "business objects" or simply "objects". The overview page 100 can be generated in an enterprise computing system to present overview information about any or all of several objects used there. In some implementations, the overview page 100 can be the sole target of links to a specific business object. For example, while viewing an interface, a user may select a link that is a reference to a business object, and the overview page 100 can be displayed in response to the user selection. In some implementations, the overview page 100 can display read-only information about a business object. For example, in such an implementation the user can edit the business object by selecting a link 102, which can result in the display of another page on which the user can edit the object. In some implementations, the business object can be a part of a hierarchy of business objects. For example, a business object that represents a marketing campaign may be a part of a hierarchy of objects where the root object corresponds to a marketing plan. Moreover, the overview page 100 can include a hierarchy GUI component to present at least a portion of the hierarchy.

A business object can represent an entity or a concept in a particular business context. For example, a business object can represent a sales order, a product, or an advertising campaign. Business objects can be grouped into categories based on the concept they represent. For example, several sales order business objects can be grouped into a sales order category, and several advertising campaign business objects can be grouped into an advertising campaign category.

A business object category can be represented by a category name, which can identify the type of the business object. For example, the overview page 100 displays information about an example business object which has a category name of "Campaign" 104. The object displayed in the overview page 100 represents an advertising campaign, which can be part of a marketing plan. The marketing plan can include one or more campaigns. An advertising campaign can have one or more components, or elements, associated with it. For example, an advertising campaign can involve a preparatory stage, sending correspondence to customers, and evaluating results, and each of these can have a corresponding element in the system.

The overview page 100 includes a toolbar 106 on the top of the screen. The toolbar 106 can provide access to general functionality, such as a search function, help resources, and a log-off link to name a few examples. The overview page 100 can also have a navigation area 108 on the left side of the screen. The navigation area 108 can provide access to other areas of the system, including work center screens which are related to the displayed business object and/or to other business objects. For example, the navigation area 108 here includes links to marketing, sales and service work center areas, each of which can be displayed on a separate screen. The overview page 100 can be reached by a user as a result of the user viewing and selecting a link to an object displayed on a work center screen. As another example, the user can navigate to an overview page by navigating to a search screen using the navigation area 108, performing a search, and then selecting an item in a search results list.

The overview page 100 can have an overview area 110 which can occupy an area of the screen not taken up by the toolbar 106 and the navigation area 108. The overview area 110 can be used to display detailed information related to the selected business object. The overview area 110 can include a first GUI component 112 and one or more second GUI components, such as a segments component 114*a*, a notes component 114*b*, and an involved parties component 114*c*. In some implementations, the toolbar 106 and the navigation area 108 are considered as separate from the overview area 110. For example, the overview area 110 in such an implementation can be updated without any change in the toolbar 106 or the area 108. As another example, the toolbar 106 and the area 108 can also be used when content other than the overview area 110 is presented in the page 100. There will later be described an example that the area 110 can include a hierarchy GUI component.

The GUI component 112 can display any or all attributes of a selected business object. For each business object type, a list of attributes can be identified which describe business object instances of that type. Advertising campaign business objects can be characterized by attributes 116 such as description, type, objective, tactic and priority attributes, to name a few examples. A particular business object instance can have one or more attribute values 118 associated with each of the attributes 116. For example, the campaign business object displayed in the overview page 100 has a value of "Summer Campaign" for the description attribute, a value of "Information Campaign" for the type attribute, a value of "Brand Awareness" for the objective attribute, a value of "Direct Contact" for the tactic attribute and a value of "High" for the priority attribute. The GUI component 112 displays other attribute values for the example campaign business object, such as planned start and end date attributes 120. In some implementations, the GUI component 112 includes the attributes that a user has the authority to edit, for example by invoking the link 102. These attributes can be presented whether or not the GUI component 112 permits editing. In other implementations, the user can be authorized to view all data related to an object, but not to edit any of the data.

The GUI components 114a-c can display information about instances of the business objects that are associated with the selected business object instance. For example, the campaign business object can be related to business objects which represent people, such as a campaign manager 122, and which are therefore displayed in GUI component 114c, which displays business objects which represent parties (e.g., people or organizations) who are involved in the campaign. Another example is an external agency business object 124. Thus, associated business object instances which are of the same type of business object can be grouped by type.

The GUI components 114a-c can display a subset of attributes for the associated object instance. For example, a name 126 and an address 128 of the external agency business object 124 are displayed in the GUI component 114c. GUI components such as the GUI component 114c can display a link, such as a link 130, which can provide a way for a user to reach a different overview page for an associated business object instance. For example, if the user clicks on the link 130, an overview page can be displayed for the external agency business object 124. Such an overview page can have its respective information presented by GUI components similar to those of the overview page 100.

The GUI components 114a-c can alternatively be configured to present data of the associated object(s) in other ways. For example, one or more of the GUI components can have the ability to present information in a table form. Such a GUI component can be provided with a pagination function that distributes the table-based information over one or more user-selectable pages. That is, when the table content is too large to be shown all at once in the GUI component, the pagination function can provide selective presentation of any of a number of pages.

As another example, the GUI components can provide a function that can be selectively initiated by the user. Such a function can include an object services function to be applied to the current object. For example, the object services function can involve retrieving or generating administration data, changing a document or accessing a workflow log.

The GUI components 114a-c can have an operation mode that controls the loading of the associated object data. The operation mode can be auto load or deferred load, to name two examples. In auto load mode, associated object attributes are automatically loaded and presented upon the overview page 100 being displayed. With a GUI component that operates in deferred load mode, in contrast, associated object attributes are not immediately loaded and presented when the page 100 is displayed. Rather, they are retrieved upon the user activating the particular GUI component, such as by selecting the "Show Notes" link, to trigger the loading and presentation of the associated object attributes. This can, for example, be a configuration setting done by a developer or administrator.

The user can configure a setting for a GUI component by selecting a "Personalize" link, such as a link 132. Selecting the link 132 can result in the display of an interface which can allow the user to configure one or more aspects relating to the object, such as the number of columns and/or rows to be displayed for the hierarchy. The user may also be able to specify that particular GUI components should be hidden upon display of an overview page 100. This, too, can be advantageous to the user, because it can provide a screen that is more relevant to the user's needs, and the need to load and display certain less relevant screen content is eliminated.

As shown in the FIG. 1 example, the overview page 100 can include at least one hierarchy link 136. In some embodiments, the hierarchy link 136 may open a hierarchy GUI component in the same way with, for example, the currently displayed object selected in the hierarchy. In other embodiments, the hierarchy link 136 may open a hierarchy GUI component in different manners. For example, the user may select the hierarchy link 136 to open a hierarchy GUI component with the current displayed object selected, in one implementation, or in another implementation the user may select the hierarchy link 136 to open a hierarchy GUI component with a default object (e.g., a root of the hierarchy) selected. After selecting the hierarchy link 136 at least a portion of the hierarchy containing the summer campaign object is displayed. For example, the hierarchy portion can be displayed in a hierarchy GUI component as shown in FIG. 2.

Figure 2:
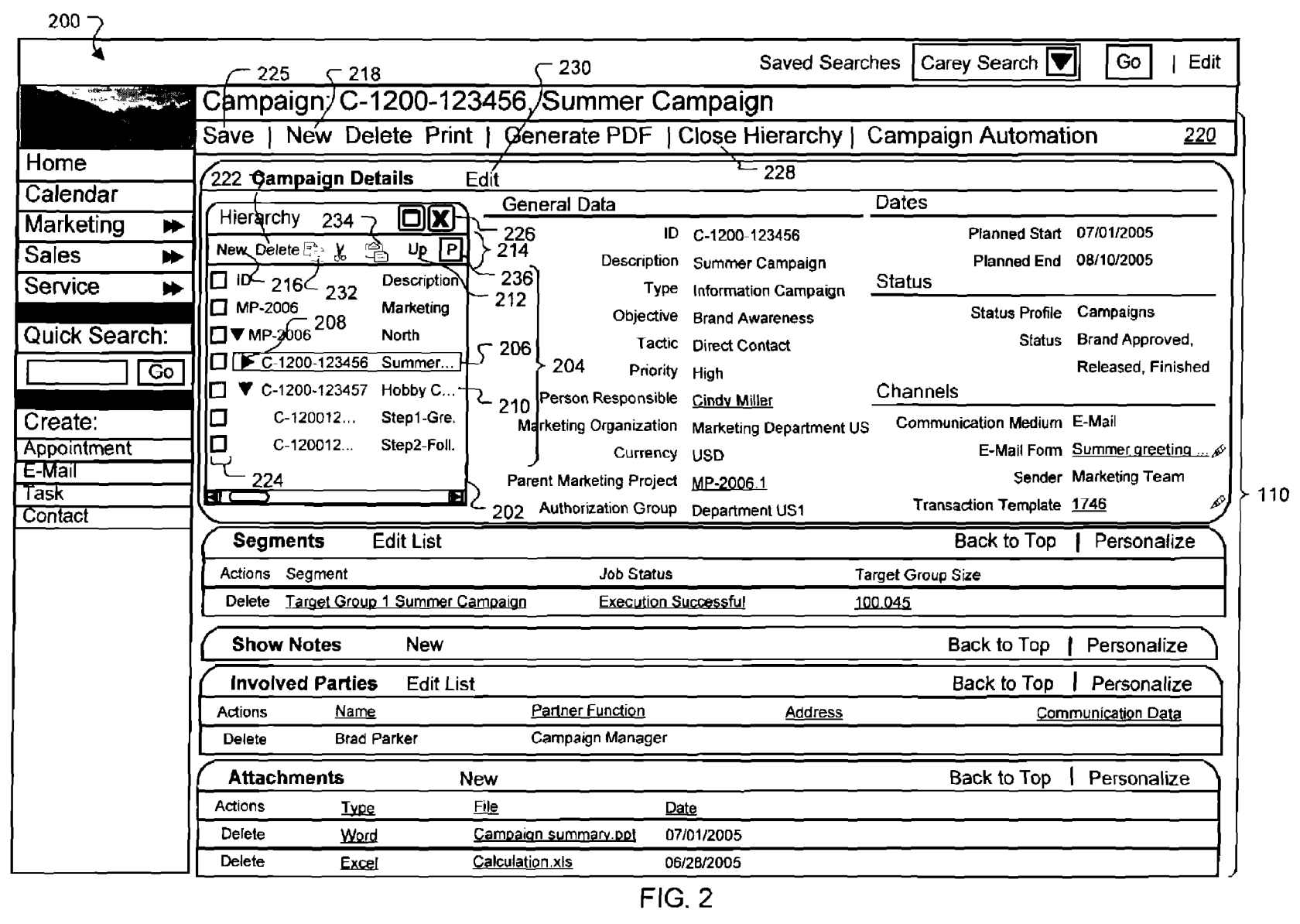

FIG. 2 shows an example of an overview page 200 that presents at least part of a hierarchy of the object and that can be displayed after the hierarchy link 136 is selected. As shown, a navigable object hierarchy is displayed in a hierarchy GUI component 202. The hierarchy GUI component 202 currently presents a hierarchy portion 204 that may or may not be the entire hierarchy. For example, the hierarchy portion 204 may be a portion of a treelike structure of one or more types of objects in more than one level. In the depicted example, the hierarchy portion 204 is a portion of a hierarchy that includes a marketing plan with an ID "MP-2006". The hierarchy GUI component 202 presents objects in the hierarchy portion 204 by displaying some information of the objects. Here, the hierarchy GUI component 202 displays an ID, a description, and possibly other information of the objects that can be viewed using a scroll bar in the GUI component 202.

An object in the hierarchy portion 204 can be selected in the hierarchy GUI component 202. As shown, a summer campaign object 206 is currently selected in the hierarchy portion 204. For example, this can be because the campaign object 206 was displayed in the overview area 110 when the hierarchy GUI component 202 was initiated. In some examples, the summer campaign object 206 can include or encompass several objects of more than one object type. For example, the user can use an expand button 208 to display sub-objects, such as campaign steps, contained in the summer campaign object 206. Using the expand button 208, the user can also collapse displayed sub-objects into a parent object of the sub-objects. Thus, the hierarchy GUI component can give a user an overview of the current object's position in the hierarchy.

Using the hierarchy GUI component 202, the user can navigate to one or more other objects in the hierarchy. In one example, the user can directly select another object, such as a hobby campaign object 210 using a pointing device (e.g., a mouse). In another example, the user can use an "up" button 212 to navigate upward in the hierarchy. In some embodiments, the overview page 200 refreshes the overview area 110 when the user selects another object using the hierarchy GUI component 202. Thus, the user can then see the corresponding contents of the object that was navigated to. In some examples, the overview page 200 can update detailed information in the hierarchy without opening another overview page. For example, when the user navigates to the hobby campaign object 210, the overview page 200 may be refreshed as described with reference to FIG. 3.

The hierarchy GUI component 202 can also provide for manipulation of any user-selected object in the hierarchy. In the depicted example, the user can select and make changes directly on any or all displayed elements (e.g., ID or description) in the hierarchy GUI component 202. For example, the user can select an object in the hierarchy GUI component and change its name. Thus, the hierarchy GUI component 202 can provide a convenient editing tool.

Optionally, the hierarchy GUI component 202 can include a tool bar 214. Using the tool bar 214, the user can, for example, create a new object in the hierarchy or delete one or more objects in the hierarchy. For example, the user can create a new object using a "new" button 216 in the tool bar 214. Some examples of creating a new object using the "new" button 216 are described with reference to FIG. 4. In contrast, the user can use a "new" button 218 in a general toolbar 220 to generate a whole new root node for the hierarchy. In some embodiments, the user can select a delete button 222 in the tool bar 214 to delete a selected object.

Depending on a present application, the hierarchy GUI component 202 can also provide multi-select functionality. In the depicted example, the hierarchy GUI component 202 offers a multi-select operation mode that includes check boxes 224 for selection of the objects. In another example, the hierarchy GUI component can include a selector for each of the selectable objects, such as a switch used to select among alternatives, to facilitate selection. The user can use the check boxes 224 to select more than one object. After the objects are selected using the check boxes 224, the user can perform a function, such as functions provided in the tool bar 214, on the selected objects. For example, the user can delete both the object 206 and the object 210 using the multi-select function. To do this, the user can first select those of the check boxes 224 that are next to the objects 206, 210. Next, the user can select the delete button 222 to delete the objects 206, 210.

In some examples, the hierarchy GUI component 202 may offer other operation modes, such as a non-edit operation mode and a single-edit operation mode. In some implementations, non-edit mode means that the user cannot edit within the hierarchy. That is, the user cannot click into a cell of the hierarchy to change its value. In some implementations, single-edit mode means that the user first needs to select a row in the hierarchy before the user can edit a cell in this row. In some implementations, multi-edit mode means that the hierarchy is in "Edit Mode". The user can then click directly into a cell of the hierarchy to change the values without selecting a row.

For example, if the application is designed to use the hierarchy GUI component 202 only for navigation and displaying objects, the single-edit operation mode may be offered, and the check boxes 224 may then not be not provided in the hierarchy GUI component 202. In another example, if the application is used to display read-only information about a hierarchy of business objects, the non-edit operation mode may be offered, in which capabilities of modifying the business objects in the hierarchy (e.g., making changes to object names) are disabled.

The page 200 here includes a Save button 225 that can be used to apply one or more changes. Such changes can include, but are not limited to, edits, cut and paste operations, copy and paste operations, and delete operations. For example, the Save button 225 can be used to apply change(s) in the hierarchy GUI component 202.

The hierarchy GUI component 202 also includes a close button 226. In the depicted example, the user can select the close button 226 to close the hierarchy GUI component 202 to return to the overview page 100. Alternatively, the user can also close the hierarchy GUI component 202 using a close hierarchy link 228.

Figure 3:
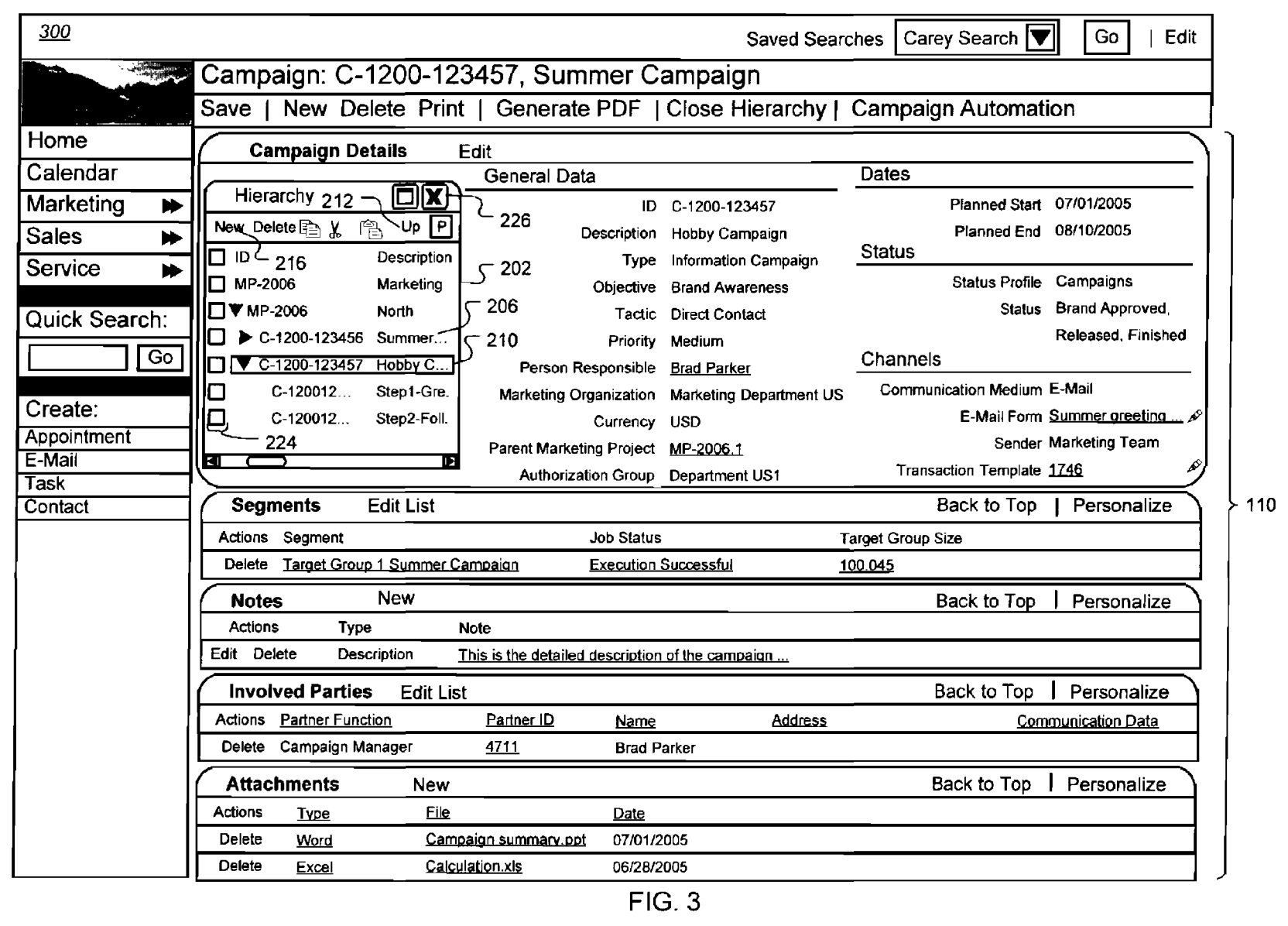

FIG. 3 shows an example of an overview page 300 that can be presented when the user navigates to the hobby campaign object 210. As shown, the overview area 110 now displays corresponding data of the selected hobby campaign object 210 in the hierarchy. In the depicted example, after the user navigates from the summer campaign object 206 to the hobby campaign object 210, the overview page 300 updates the overview area 110 from presenting information about the summer campaign object 206 to presenting information about the hobby campaign 210. Depending on the selected object, different data, different fields, or different segment components may be presented, to name a few examples. Also, a different portion of the hierarchy can become visible in the hierarchy GUI component 202. For example, the user can personalize a default portion of the hierarchy to be displayed for each object. An example of personalizing the characteristics, including information, location, and size, of the hierarchy GUI component 202 is described with reference to FIG. 5.

Here, the user can navigate to another object using the "up" button 212 or by directly selecting another object in the hierarchy GUI component 202. In some embodiments, the hierarchy GUI component 202 may provide similar functionality as the previous overview page 200, such as creating a new object using the "new" link 216 or closing the hierarchy using the close hierarchy button 226.

Referring again to FIG. 2, the overview area 110 in this example is not configured for user editing. In response to a user input, such as a selection of an edit link 230, the overview page 200 may be refreshed to present an editable overview area. The user can use the editable overview area to edit one or more fields in the detail information (e.g., an ID, a description, a type, etc.) of the summer campaign object 206. In some embodiments, the editable overview area includes the hierarchy GUI component 202. The user can use the hierarchy GUI component 202 to navigate to another one of the several objects in the hierarchy portion 204, and the editable details area can then be updated to provide an editable version of the other object.

In some embodiments, the editable overview area may also be displayed when the user is creating a new object. In one example, the user input can be made using the hierarchy GUI component 202, such as by selecting the "new" link 216. The user may further identify a level of the hierarchy where the new object should be created, and a type of the new object. In some embodiments, the overview page 200 may create a new object by identifying the level and the type using the currently selected object in the hierarchy.

In another example, the user can copy the summer campaign object 206 in the hierarchy to create the new object. As an illustrative example, a user can copy the summer campaign object 206 by selecting the summer campaign object 206 and then select a copy link 232. Next, the user can paste the copied object using a paste link 234 to create a new object. For example, the user can select the object node MP-2006 and then select the paste link 234 to paste the copied object under the MP-2006 object node.

Figure 4:
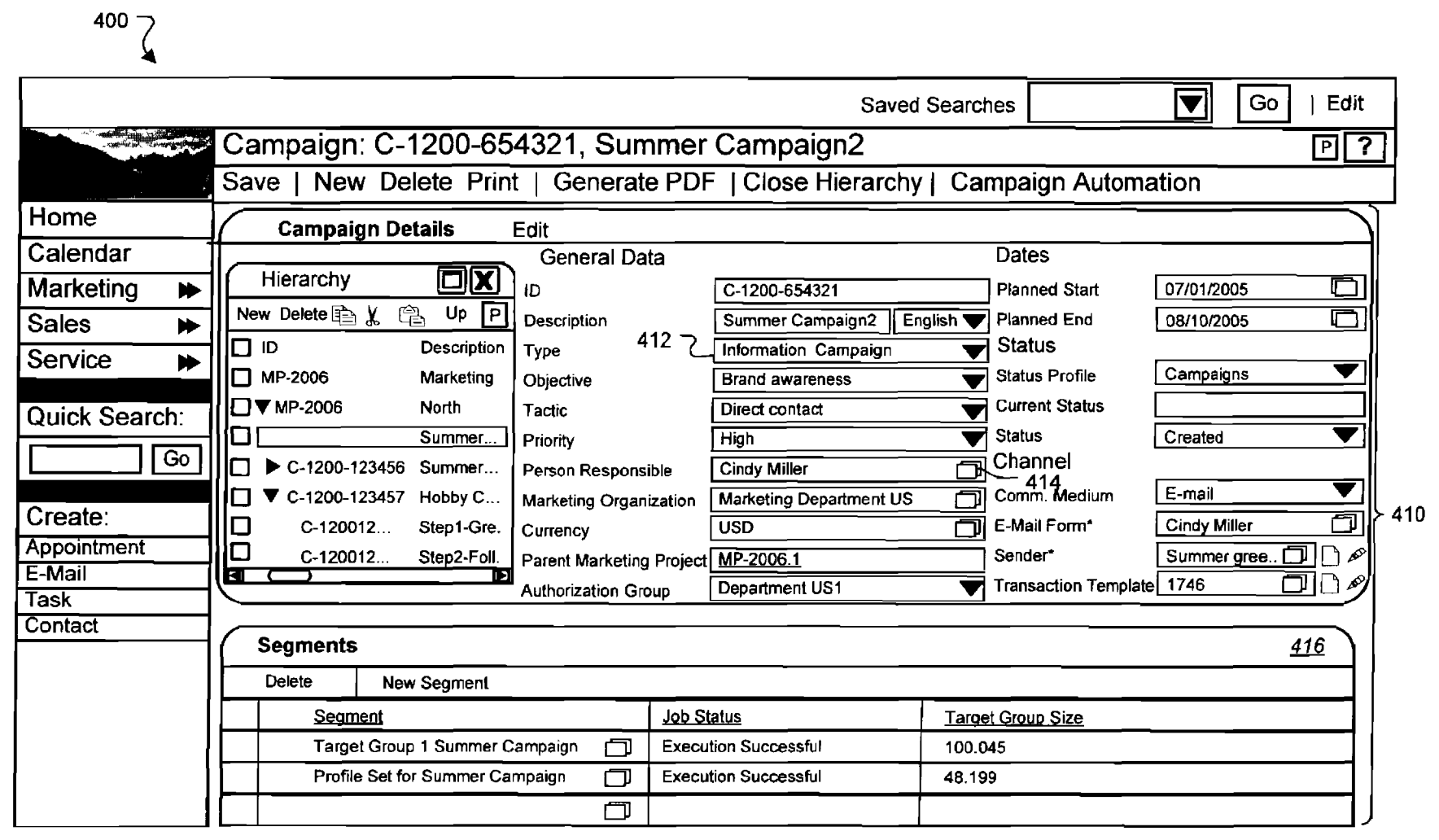

FIG. 4 shows an example overview page 400 that includes an editable overview area 410 after the user copied and pasted the summer campaign object 206 under the MP-2006 object node. As shown, a new object "summer campaign2" is created with information, displayed in the editable overview area 410, of the summer campaign object predefined in the new object. For example, the new object may have a type predefined as the type of the previously selected summer campaign object 206. Additionally, the hierarchy GUI component 202 may also place the new object at a level under the MP-2006 object node. In another example, the user can cut the object using a "cutting" tool or control and thereafter paste the cut object at a desirable place. Such cutting and pasting can allow the user to move an object from one place in a hierarchy to another, to name just one example.

Using the editable overview area 410, the user can specify details information of the new object as needed. For example, a user can modify the object type of the summer campaign2 object using a pull down menu 412. As another example, the user can also select another person responsible for the campaign by selecting a contact selection link 414 and select another person responsible for the campaign. The user can also modify segment components associated with the new object using the segment GUI component 416.

Referring again to FIG. 2, the hierarchy GUI component 202 includes a personalize link 236 for modifying the hierarchy GUI component 202. In various embodiments, the user can configure a presentation of the hierarchy GUI component 202 by modifying a personalized setting of the hierarchy GUI component 202. When the user selects the personalize link 236, a configuration interface (e.g., a personalization page) may be loaded for the user to change the personalized settings of the hierarchy GUI component 202.

Figure 5:
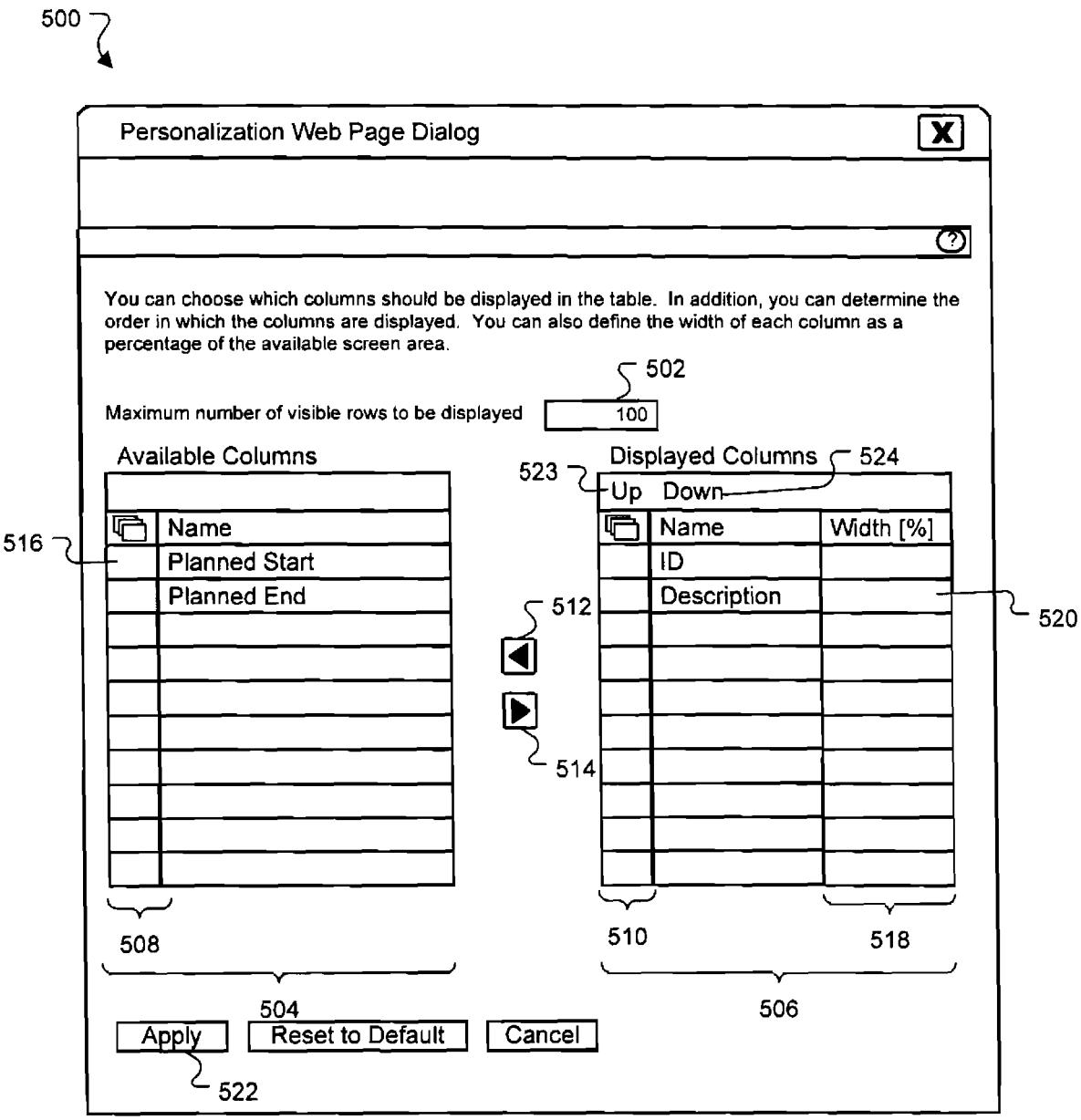
FIG. 5 shows an example of a personalization screen.

FIG. 5 shows an example of a personalization page 500 that can be used for defining specifics for one or more hierarchy visualizations. The use of the term "personalization" in these examples stems from the nomenclature in which personalization of software is distinct from configuration of the software. That is, configuration can include the definition of parameters that an application program uses. In some situations, configuration is the responsibility of application developers or administrators. A personalization, in contrast, can involve adjustment of the software to a user's individual needs. This, in turn, can be done directly by the user or by someone else on behalf of the user.

The personalization page 500 here includes a text box 502 to set a maximum number of visible rows to be displayed. In some embodiments, the number may be used to determine the size of the hierarchy portion 204 displayed in the hierarchy GUI component 202.

The page 500 includes an area 504 and an area 506. The area 504 shows a list of available columns, any or all of which can be added to the hierarchy GUI component 202 for display. The area 506 shows a list of columns that the hierarchy GUI component 202 is currently configured to display. Here, each row in the area 504 and the area 506 represents a column element. A column element in the area 504 is a column element that is available for display. A column element in the area 506 is a column element that is selected to be displayed in the hierarchy GUI component 202.

The area 504 and the area 506 include selection boxes 508, 510, respectively. The user can select any of the column elements using the selection boxes 508, 510. After one or more selections are made, the user can move the selected column elements using a left button 512 or a right button 514. For example, the user can add a planned start column to display by selecting a selection box 516 and moving the planned start column to the area 506 using the right button 514. In another example, the user can remove a description column from the displayed column by selecting the description column element and moving the description column element to the area 504 using the left button 512. Here, the user selects an ID column and a description column to be displayed in the hierarchy GUI component 202. By adding and removing elements in the right area 506, the user can specify a number of columns to be used in the hierarchy GUI component 202.

The user can also specify a width for each of the displayed columns using input boxes 518. In the depicted example, the user can specify a proportion of an available screen area that each of the displayed column can occupied. For example, the user can set the description column to occupy 10% of the available width of the hierarchy GUI component 202 by entering "10" in the input box 520. Using the personalization page 500, the user can specify a size of the hierarchy GUI component 202. In this example, the width input boxes 518 are left empty. In some embodiments, the hierarchy GUI component 202 may retrieve a default width for each of the displayed column from a database if no width parameter is defined.

Additionally, the user can also specify locations of the displayed columns using the area 506. In some embodiments, the hierarchy GUI component 202 may display columns in an order related to an order of the column elements in the right area 506. For example, a column element in the first row may be displayed as the leftmost column in the hierarchy portion 204, and column elements in the subsequent rows may be displayed to the right of the column listed in the previous row. In this example, the user can select one of the displayed columns in the area 506 and specify its relative location by rearranging an order of the column elements in the area 506. The relocation can be done by dragging and dropping the element (s) or by activating an input control 523, 524 that moves the selected element(s) upward or downward.

In the depicted example, the user selects to display the ID column and the description column with a default width, while the ID column is displayed to the left of the description column. After the user finishes modifying the personalized setting of the hierarchy GUI component 202, the user can select an apply button 522 to apply the modified setting.

Figure 6:
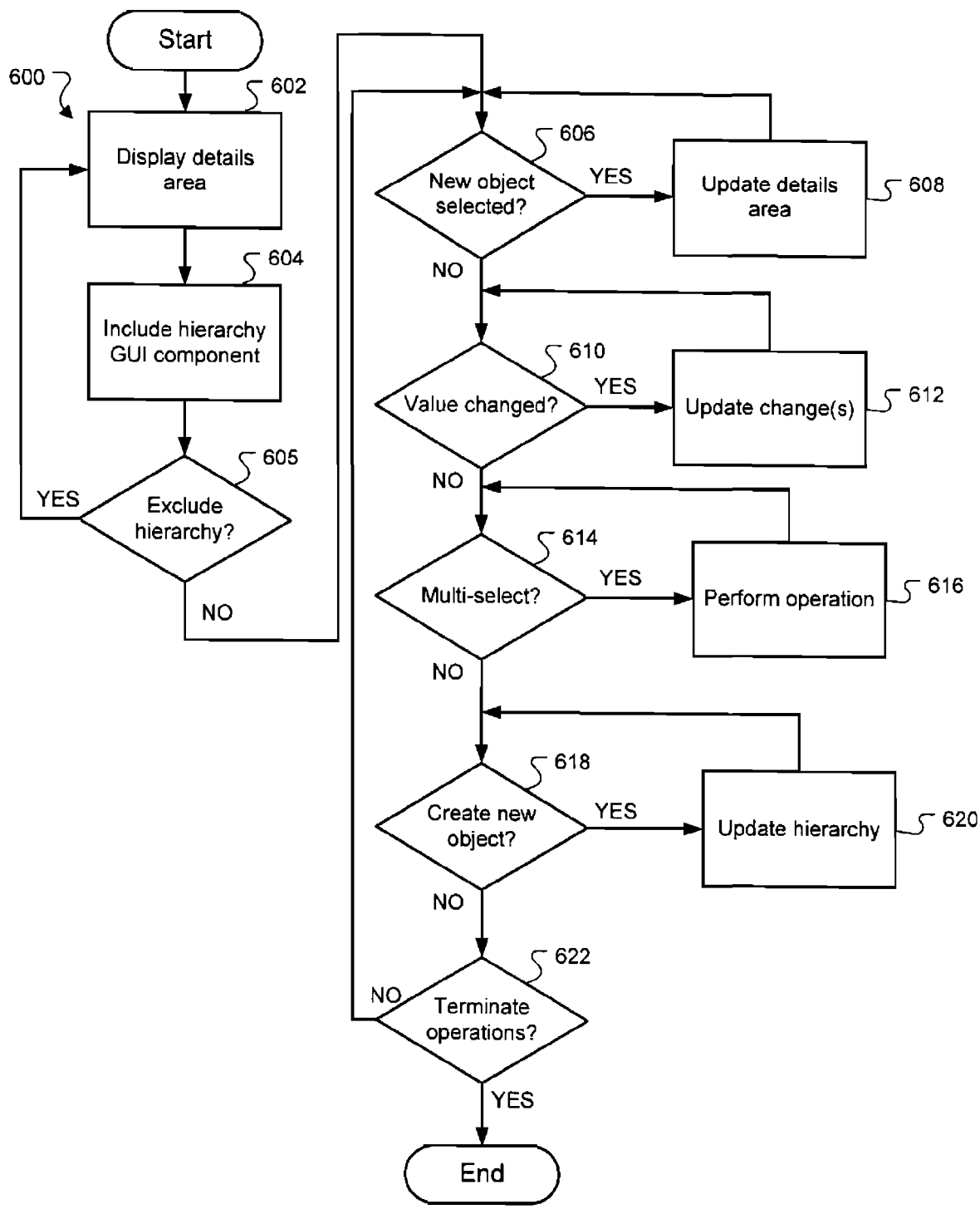
FIG. 6 shows an example of a flow chart for a method.

FIG. 6 is a flow chart of exemplary operations 600 that can be performed for visualizing a navigable object hierarchy. The operations 600 can be performed by a processor executing instructions stored in a computer program product. The operations 600 begin in step 602 with displaying a details area on a display device. For example, the overview area 110 containing detailed information may be displayed in the overview page 100. In step 604, the operations 600 comprise including a hierarchy GUI component in the details area. For example, the user may activate the hierarchy GUI component 202 by selecting the hierarchy link 134.

In step 605, it is determined whether the hierarchy is to be excluded from the subsequent processing in the operations 600. This can be the case if the particular hierarchy component is one that does not provide object selection, value changing, multi-selection or creation of new objects, to name a few examples. A setting can be made in advance for the hierarchy regarding whether it should be included. Accordingly, a reading of such a setting can determine whether the operations after step 605 continue with step 602 (if the hierarchy is to be excluded) or if they continue with step 606 (if the hierarchy is not to be excluded from the operations).

Next, the operations 600 comprise, in step 606, determining whether a new object is selected. For example, it may be determined whether the user navigates to another object in the hierarchy GUI component 202. If it is determined that a new object is selected, the operations 600 comprise updating the details area in step 608 and the operations 600 thereafter again perform the step 606. For example, the overview area 110 may be updated when the user navigates from the summer campaign object 206 to the hobby campaign object 210.

If it is determined that a new object is not selected, the operations 600, in step 610, comprise determining whether a value in the hierarchy, such as a name, has changed. For example, it may be determined whether the user edited a name of the selected object in the hierarchy GUI component 202. If it is determined that a value is changed, the operations 600 comprise updating one or more changes in step 612, after which the step 610 can again be performed.

If it is determined that a value is not changed, in step 614, the operations 600 comprise determining whether a multi-select operation is selected to be executed. For example, it may be determined that multiple objects are selected using the check boxes 224 and an operation is selected to be performed for the selected objects. If it is determined that a multi-select operation is selected to be executed, the operations 600 comprise performing the operation in step 616 and the operations 600 perform the step 614.

If it is determined that a multi-select operation is not selected to be executed, the operations 600 comprise determining whether a new object is created in step 618. For example, the user can create a new object by selecting the "new" buttons 216, 218 or by copying and pasting an existing object in the hierarchy GUI component 202. If it is determined that a new object is created, the operations 600 comprise updating the hierarchy in, for example, a database in step 620 and the operations 600 perform the step 618. If it is determined that a new object is not created, it is determined in step 622 whether to terminate the operations. For example, this can occur at a predefined time or upon the user navigating to another application in the system. If the operations 600 are not terminated in the step 622, they again perform the step 606.

The flow chart discussed above is an example and other approaches can be used. For example, any of the steps 606-622 can be performed in a different order.

FIGS. 8A-B illustrate examples of positions for a hierarchy. FIG. 8A shows the page 200 where a hierarchy GUI component (here denoted "Installed Base Hierarchy") is not included in the details area, but rather forms a single assignment block. Other assignment blocks (here denoted "General Data", "Name and Address" and "Parties Involved") can be placed in the page as shown. The hierarchy component here occupies about one third of the width available for assignment blocks. Other width proportions can be used. The assignment blocks are here placed under a common header (here denoted "Installed Base: 123 . . . "). Thus, the hierarchy GUI component in this example acts as an assignment block similar to any other assignment block(s) that may be included in the page.

FIG. 8B shows another example where a hierarchy component (here denoted "Product Catalog Hierarchy") assumes the full width available for assignment blocks. The hierarchy here also acts as an assignment block, as opposed to forming part of another block. Here, the blocks are included in a page entitled "Product Catalog: 119081". The hierarchy component can be created to facilitate user navigation or it can be a non-navigating element. That is, in the navigation scenario, a user can select one or more entries in the hierarchy to navigate to the corresponding object(s).

Figure 7:
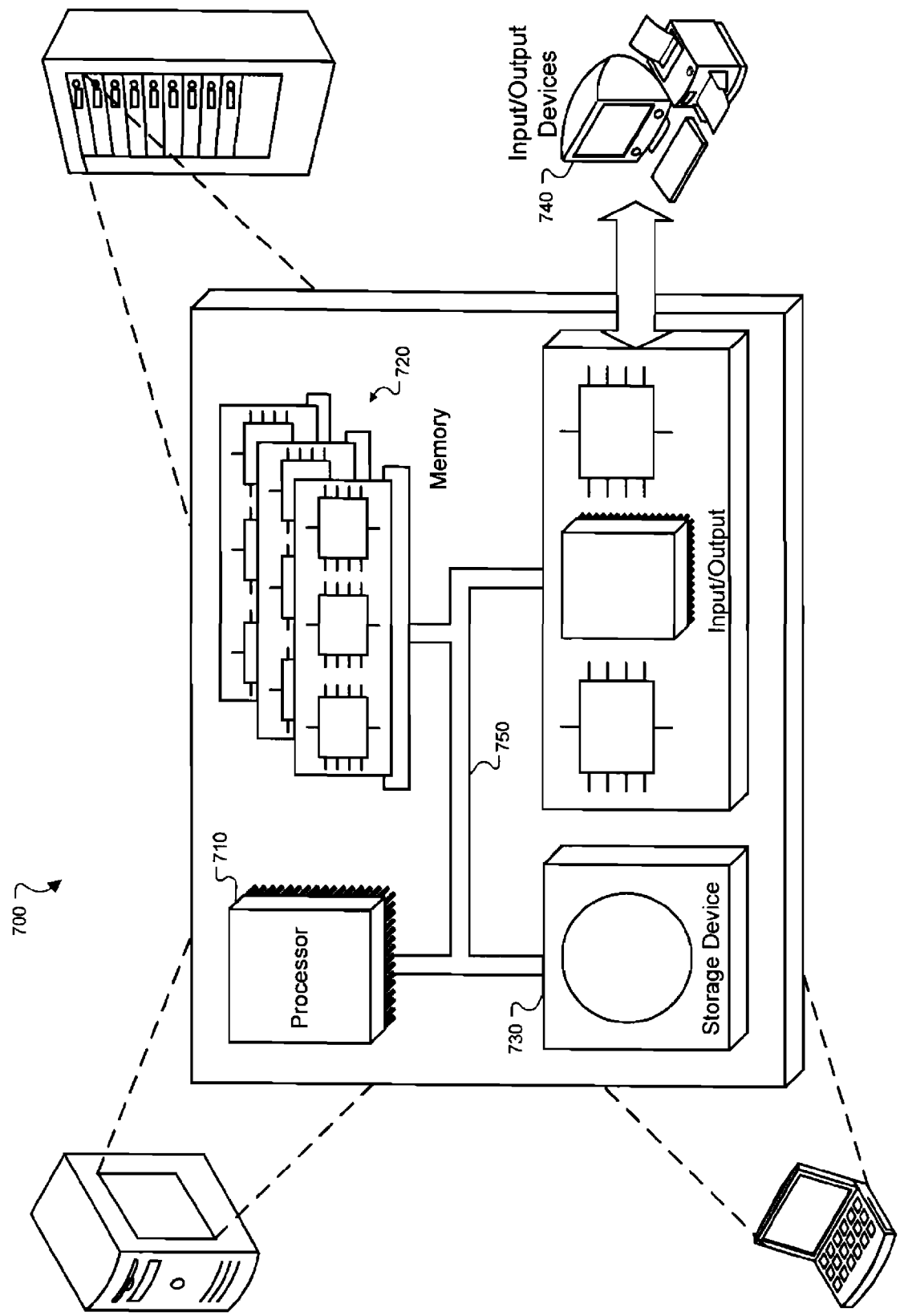
FIG. 7 is a block diagram of a computing system that can be used in connection with computer-implemented methods described in this document.

FIG. 7 is a schematic diagram of a generic computer system 700. The system 700 can be used for the operations described in association with any or the computer-implement methods described previously, according to one implementation. The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method for visualizing a navigable object hierarchy, the method comprising:

receiving, at a computing device, an indication that a particular object is to be displayed in a graphical user interface (GUI), the particular object being part of a hierarchy of objects that each include multiple attributes;

displaying, in response to receiving the indication, an object presentation GUI that includes:

(i) a details GUI component that presents the multiple attributes for the particular object, and (ii) a hierarchy GUI component that visually depicts at least a portion of the hierarchy of objects that includes the particular object, and relationships between depicted objects in the depicted portion of the hierarchy, wherein the hierarchy GUI component presents, for each of the depicted objects, at least two attributes of the multiple attributes that are stored for the depicted object, the at least two attributes being a subset of the multiple attributes, wherein the hierarchy GUI component is configured so that:

(a) a first-type user-selection, in the hierarchy GUI component, of any of the depicted objects having a different type than the particular object causes replacement, in the details GUI component, of the presentation of the multiple attributes for the particular object with a presentation of multiple attributes for the user-selected depicted object, and (b) a second-type of user-selection, in the hierarchy GUI component, of the particular object enables the user to edit a value for each of the at least two attributes of the particular object that are presented in the hierarchy GUI component, wherein user-editing of any of the at least two attributes causes an update, in the details GUI component, of the presentation of the edited attribute with an edited value;

receiving user input to display a configuration GUI that is for configuring the object presentation GUI; and displaying the configuration GUI in response to receiving the user input, the configuration GUI enabling the user to define, for each depicted object, the subset of attributes from the multiple attributes for the depicted object as the attributes that are to be displayed in the hierarchy GUI component for the depicted object.

2. The computer-implemented method of claim 1, wherein the hierarchy GUI component is further configured so that: (c) a third-type of user selection of two or more depicted objects invokes a multi-select functionality of the two or more depicted objects, wherein the multi-select functionality allows a user of the object presentation GUI to cause a function to be performed on the two or more depicted objects.

3. The computer-implemented method of claim 2, wherein the function includes copying the selected objects, and further comprising receiving user-input pasting the selected objects into the hierarchy.

4. The computer-implemented method of claim 2, wherein the function includes deleting the selected objects.

5. The computer-implemented method of claim 1, wherein the configuration GUI further enables a user to define an order of display for the subset of attributes that are for each of the objects.

6. The computer-implemented method of claim 1, wherein the configuration GUI further enables a user to define a maximum number of objects to be visually depicted.

7. A computer program product tangibly embodied in an information carrier and comprising instructions that when executed by a processor perform a method for visualizing a navigable object hierarchy, the method comprising:

receiving, at a computing device, an indication that a particular object is to be displayed in a graphical user interface (GUI), the particular object being part of a hierarchy of objects that each include multiple attributes;

displaying, in response to receiving the indication, an object presentation GUI that includes:

(i) a details GUI component that presents the multiple attributes for the particular object, and (ii) a hierarchy GUI component that visually depicts at least a portion of the hierarchy of objects that includes the particular object, and relationships between depicted objects in the depicted portion of the hierarchy, wherein the hierarchy GUI component presents, for each of the depicted objects, at least two attributes of the multiple attributes that are stored for the depicted object, the at least two attributes being a subset of the multiple attributes, wherein the hierarchy GUI component is configured so that:
- (a) a first-type user-selection, in the hierarchy GUI component, of any of the depicted objects having a different type than the particular object causes replacement, in the details GUI component, of the presentation of the multiple attributes for the particular object with a presentation of multiple attributes for the user-selected depicted object, and
- (b) a second-type of user-selection, in the hierarchy GUI component, of the particular object enables the user to edit a value for each of the at least two attributes of the particular object that are presented in the hierarchy GUI component, wherein user-editing of any of the at least two attributes causes an update, in the details GUI component, of the presentation of the edited attribute with an edited value;

receiving user input to display a configuration GUI that is for configuring the object presentation GUI; and displaying the configuration GUI in response to receiving the user input, the configuration GUI enabling the user to define, for each depicted object, the subset of attributes from the multiple attributes for the depicted object as the attributes that are to be displayed in the hierarchy GUI component for the depicted object.

8. The computer program product of claim 7, wherein the hierarchy GUI component is further configured so that: (c) a third-type of user selection of two or more depicted objects invokes a multi-select functionality of the two or more depicted objects, wherein the multi-select functionality allows a user of the object presentation GUI to cause a function to be performed on the two or more depicted objects.

9. The computer program product of claim 8, wherein the function includes deleting the selected objects.

10. The computer program product of claim 8, wherein the function includes copying the selected objects, and further comprising receiving user-input pasting the selected objects into the hierarchy.

11. The computer program product of claim 7, wherein the configuration GUI further enables a user to define an order of display for the subset of attributes that are for each of the objects.

12. The computer program product of claim 7, wherein the configuration GUI further enables a user to define a maximum number of objects to be visually depicted.

13. A system comprising:
a computer readable medium comprising instructions; and
one or more processors configured to execute the instructions to perform operations comprising:
  receiving, at a computing device, an indication that a particular object is to be displayed in a graphical user interface (GUI), the particular object being part of a hierarchy of objects that each include multiple attributes;
  displaying, in response to receiving the indication, an object presentation GUI that includes:
  - (i) a details GUI component that presents the multiple attributes for the particular object, and
  - (ii) a hierarchy GUI component that visually depicts at least a portion of the hierarchy of objects that includes the particular object, and relationships between depicted objects in the depicted portion of the hierarchy, wherein the hierarchy GUI component presents, for each of the depicted objects, at least two attributes of the multiple attributes that are stored for the depicted object, the at least two attributes being a subset of the multiple attributes, wherein the hierarchy GUI component is configured so that:
    - (a) a first-type user-selection, in the hierarchy GUI component, of any of the depicted objects having a different type than the particular object causes replacement, in the details GUI component, of the presentation of the multiple attributes for the particular object with a presentation of multiple attributes for the user-selected depicted object, and
    - (b) a second-type of user-selection, in the hierarchy GUI component, of the particular object enables the user to edit a value for each of the at least two attributes of the particular object that are presented in the hierarchy GUI component, wherein user-editing of any of the at least two attributes causes an update, in the details GUI component, of the presentation of the edited attribute with an edited value;

receiving user input to display a configuration GUI that is for configuring the object presentation GUI; and
  displaying the configuration GUI in response to receiving the user input, the configuration GUI enabling the user to define, for each depicted object, the subset of attributes from the multiple attributes for the depicted object as the attributes that are to be displayed in the hierarchy GUI component for the depicted object.

14. The system of claim 13, wherein the hierarchy GUI component is further configured so that: (c) a third-type of user selection of two or more depicted objects invokes a multi-select functionality of the two or more depicted objects, wherein the multi-select functionality allows a user of the object presentation GUI to cause a function to be performed on the two or more depicted objects.

15. The system of claim 14, wherein the function includes deleting the selected objects.

16. The system of claim 14, wherein the function includes copying the selected objects, and further comprising receiving user-input pasting the selected objects into the hierarchy.

17. The system of claim 13, wherein the configuration GUI further enables a user to define an order of display for the subset of attributes that are for each of the objects.

18. The system of claim 13, wherein the configuration GUI further enables a user to define a maximum number of objects to be visually depicted.

* * * * *